US009262784B2

United States Patent
Shi

(10) Patent No.: US 9,262,784 B2
(45) Date of Patent: Feb. 16, 2016

(54) METHOD, MEDIUM, AND SYSTEM FOR COMPARISON SHOPPING

(75) Inventor: Kenny Shi, Fremont, CA (US)

(73) Assignee: eBay Inc., San Jose, CA (US)

( * ) Notice: Subject to any disclaimer, the term of this patent is extended or adjusted under 35 U.S.C. 154(b) by 1378 days.

(21) Appl. No.: 12/102,387

(22) Filed: Apr. 14, 2008

(65) Prior Publication Data

US 2008/0255967 A1 Oct. 16, 2008

Related U.S. Application Data

(60) Provisional application No. 60/912,077, filed on Apr. 16, 2007.

(51) Int. Cl.
*G06Q 30/00* (2012.01)
*G06Q 30/06* (2012.01)
*G06Q 30/08* (2012.01)

(52) U.S. Cl.
CPC ........ *G06Q 30/0643* (2013.01); *G06Q 30/0603* (2013.01); *G06Q 30/0623* (2013.01); *G06Q 30/0627* (2013.01); *G06Q 30/0629* (2013.01); *G06Q 30/0633* (2013.01); *G06Q 30/0641* (2013.01); *G06Q 30/08* (2013.01)

(58) Field of Classification Search
CPC ....................... G06Q 30/0641; G06Q 30/0643
USPC ............................................. 705/26.1, 26.64
See application file for complete search history.

(56) References Cited

U.S. PATENT DOCUMENTS

| 5,910,987 | A | 6/1999 | Ginter et al. |
| 6,026,376 | A | 2/2000 | Kenney |
| 6,073,124 | A | 6/2000 | Krishnan et al. |
| 6,141,006 | A | 10/2000 | Knowlton et al. |
| 6,295,559 | B1 | 9/2001 | Emens et al. |
| 6,405,175 | B1 | 6/2002 | Ng |
| 6,493,744 | B1 | 12/2002 | Emens et al. |
| 7,058,625 | B2 | 6/2006 | Bossemeyer, Jr. et al. |
| 7,249,139 | B2 | 7/2007 | Chuah et al. |

(Continued)

FOREIGN PATENT DOCUMENTS

| EP | 1296241 A1 | 3/2003 |
| WO | WO-0111511 A1 | 2/2001 |

(Continued)

OTHER PUBLICATIONS http://www.velocityreviews.com/forums/t337777-extract-title-from-html-documents.html—Nov. 4, 2004.*

(Continued)

*Primary Examiner* — Matthew Zimmerman
(74) *Attorney, Agent, or Firm* — Schwegman Lundberg & Woessner, P.A.

(57) ABSTRACT

Embodiments of computer implemented systems and methods for comparison shopping are described. One example embodiment includes receiving a data resource associated with a web page, the web page including an offering of a product and product offering terms, extracting product descriptors from the data source, requesting a search of marketplace offerings of the product based on the product descriptors, receiving results of the search (the results including marketplace offering terms of the marketplace offerings of the product), and displaying the marketplace offering terms, thereby facilitating comparison of the product offering terms with the marketplace offering terms.

20 Claims, 7 Drawing Sheets

(56) References Cited

U.S. PATENT DOCUMENTS

| | | | |
|---|---|---|---|
| 7,266,511 B2 | 9/2007 | Teshima | |
| 7,269,573 B1 | 9/2007 | Bunn et al. | |
| 8,260,687 B2 | 9/2012 | Chang et al. | |
| 8,977,631 B2 | 3/2015 | Sundaresan | |
| 2001/0011239 A1 | 8/2001 | Kondoh et al. | |
| 2001/0020231 A1 | 9/2001 | Perri, III et al. | |
| 2001/0034661 A1 | 10/2001 | Ferreira | |
| 2001/0037368 A1 | 11/2001 | Huang | |
| 2001/0056377 A1 | 12/2001 | Kondoh et al. | |
| 2002/0026388 A1 | 2/2002 | Roebuck | |
| 2002/0107752 A1 | 8/2002 | Rivera et al. | |
| 2003/0014423 A1 | 1/2003 | Chuah et al. | |
| 2003/0126035 A1 | 7/2003 | Kake et al. | |
| 2003/0172174 A1 | 9/2003 | Mihalcheon | |
| 2004/0044730 A1* | 3/2004 | Gockel et al. | 709/203 |
| 2004/0083127 A1 | 4/2004 | Lunsford et al. | |
| 2004/0166401 A1 | 8/2004 | Srinivas | |
| 2004/0243568 A1 | 12/2004 | Wang et al. | |
| 2005/0027612 A1 | 2/2005 | Walker et al. | |
| 2005/0149458 A1 | 7/2005 | Eglen et al. | |
| 2005/0192958 A1 | 9/2005 | Widjojo et al. | |
| 2005/0197893 A1* | 9/2005 | Landau et al. | 705/14 |
| 2005/0251553 A1 | 11/2005 | Gottfried | |
| 2006/0085259 A1 | 4/2006 | Nicholas et al. | |
| 2006/0143095 A1 | 6/2006 | Sandus et al. | |
| 2006/0218577 A1 | 9/2006 | Goodman et al. | |
| 2006/0247946 A1 | 11/2006 | Gordon | |
| 2007/0027830 A1 | 2/2007 | Simons et al. | |
| 2007/0073580 A1* | 3/2007 | Perry et al. | 705/14 |
| 2007/0100650 A1* | 5/2007 | Ramer et al. | 705/1 |
| 2007/0112738 A1 | 5/2007 | Livaditis | |
| 2007/0118813 A1 | 5/2007 | Forstall et al. | |
| 2007/0136178 A1 | 6/2007 | Wiseman et al. | |
| 2007/0266093 A1 | 11/2007 | Forstall et al. | |
| 2008/0010167 A1 | 1/2008 | Bunn et al. | |
| 2008/0097871 A1 | 4/2008 | Williams et al. | |
| 2008/0109327 A1 | 5/2008 | Mayle et al. | |
| 2008/0113614 A1 | 5/2008 | Rosenblatt | |
| 2008/0141153 A1 | 6/2008 | Samson et al. | |
| 2008/0228595 A1* | 9/2008 | Hill | G06Q 30/0603 705/26.41 |
| 2008/0255957 A1 | 10/2008 | Erdem et al. | |
| 2008/0255962 A1 | 10/2008 | Chang et al. | |
| 2008/0256040 A1 | 10/2008 | Sundaresan et al. | |
| 2012/0323743 A1 | 12/2012 | Chang et al. | |
| 2015/0149385 A1 | 5/2015 | Sundaresan et al. | |

FOREIGN PATENT DOCUMENTS

| | | |
|---|---|---|
| WO | WO-2004059595 A1 | 7/2004 |
| WO | WO-2008130531 A1 | 10/2008 |
| WO | WO-2008130575 A1 | 10/2008 |

OTHER PUBLICATIONS

Dec. 2006—http://web.archive.org/web/20061221011601/www.adaptiveblue.com/help.html.*

U.S. Appl. No. 11/834,817, Final Office Action mailed May 12, 2010, 20 pgs.

U.S. Appl. No. 11/834,817, Non-Final Office Action mailed Sep. 21, 2009, 17 pgs.

U.S. Appl. No. 11/834,817, Response filed Dec. 22, 2009 to Non Final Office Action mailed Sep. 21, 2009, 15 pgs.

International Application Serial No. PCT/US2008/004831, Search Report mailed Jul. 14, 2008., p. 220, 4 pgs.

International Application Serial No. PCT/US2008/004831, Written Opinion mailed Jul. 14, 2008., p. 237, 5 pgs.

International Application Serial No. PCT/US2008/004912 Search Report mailed Jul. 14, 2008, 4 pgs.

International Application Serial No. PCT/US2008/004912 Written Opinion mailed Jul. 14, 2008, p. 237, 7 pgs.

Kavita, A. G, et al., "Mining Tag Clouds and Emotions behind Community Feedback", (2008), 1181-1182.

Kherfi, M. L, et al., "Combining positive and negative examples in relevance feedback for content-based image retrieval", J. Vis Commun. Image R. 14, (2003), 428-457.

Rohini, U., et al., "A novel approach for re-ranking of search results using collaborative filtering", IEEE, (2007), 5 pgs.

Sergei, V., et al., "Using web-graph distance for relevance feedback in web search", ACM 2006, 147-148.

U.S. Appl. No. 11/834,817, Appeal Brief filed Jun. 6, 2011, 17 pgs.

U.S. Appl. No. 11/834,817, Final Office Action mailed Feb. 2, 2011, 22 pgs.

U.S. Appl. No. 11/834,817, Non-Final Office Action mailed Aug. 26, 2010, 16 pgs.

U.S. Appl. No. 11/834,817, Pre-Appeal Brief Request filed Apr. 4, 2011, 5 pgs.

U.S. Appl. No. 11/834,817, Response filed Aug. 12, 2010 to Final Office Action mailed May 12, 2010, 12 pgs.

U.S. Appl. No. 11/967,911, Non Final Office Action mailed Mar. 17, 2011, 11 pgs.

U.S. Appl. No. 11/967,911, Response Filed Jun. 17, 2011 to Non-Final Office Action Received Mar. 17, 2011, 10 pgs.

International Application Serial No. PCT/US2008/004831, International Preliminary Report on Patentability mailed Oct. 20, 2009, 4 pgs.

International Application Serial No. PCT/US2008/004912, International Preliminary Report on Patentability mailed Oct. 20, 2009, 6 pgs.

U.S. Appl. No. 11/967,911, Non Final Office Action mailed Sep. 29, 2011, 12 pgs.

U.S. Appl. No. 12/104,205, Non Final Office Action mailed Oct. 4, 2011, 12 pgs.

U.S. Appl. No. 11/834,817, Decision on Pre-Appeal Brief Request mailed May 6, 2011, 2 pgs.

U.S. Appl. No. 11/834,817, Examiner's Answer to Appeal Brief mailed Aug. 25, 2011, 23 pgs.

U.S. Appl. No. 11/834,817, Reply Brief filed Sep. 27, 2011, 6 pgs.

U.S. Appl. No. 11/834,817, Response filed Nov. 24, 2010 to Non Final Office Action mailed Aug. 26, 2010, 12 pgs.

U.S. Appl. No. 11/967,911, Response filed Jan. 30, 2012 to Non Final Office Action mailed Sep. 20, 2011, 11 pgs.

U.S. Appl. No. 12/104,205, Response filed Feb. 6, 2012 to Non Final Office Action mailed Oct. 4, 2011, 12 pgs.

U.S. Appl. No. 11/967,911, Notice of Allowance mailed May 2, 2012, 10 pgs.

U.S. Appl. No. 12/104,205 , Response filed Sep. 11, 2012 to Final Office Action mailed Jun. 12, 2012, 9 pgs.

U.S. Appl. No. 12/104,205, Final Office Action mailed Jun. 12, 2012, 9 pgs.

U.S. Appl. No. 12/104,205, Final Office Action mailed Oct. 12, 2012, 10 pgs.

"Quickbuy—Innovations for e-Buisness", Item U: QuickBuy; closest NPL, (Mar./Apr. 2000), 14 pgs.

"Vendio Launches Widgipedia.com-The Ultimate Widgets Resources; Encourages Development and Distribution of Thounsands of Web and Desktop Widgets Enabling Myriad Applications", PR Newswire, Proquest # 1207770171, (Feb. 1, 2007), 4 pgs.

"Widgetbox Opens Web Widget Marketplace;New Services makes it Easy to Assemble, Share and Intergrate Web Widgets", PR Newswire, Proquest # 1134701801, (Sep. 25, 2006), 4 pgs.

Shama, David, "Wotsa Widget?", Jerusalem Post, Proquest # 895924121, (Aug. 19, 2005), 4 pgs.

U.S. Appl. No. 12/104,205, Examiner Interview Summary mailed Feb. 12, 2013, 3 pgs.

U.S. Appl. No. 12/104,205, Response filed Feb. 12, 2013 to Final Office Action mailed Oct. 12, 2013, 11 pgs.

U.S. Appl. No. 13/600,937, Non Final Office Action mailed Feb. 27, 2013, 14 pgs.

U.S. Appl. No. 13/600,937, Response filed Jul. 25, 2013 to Non Final Office Action mailed Feb. 27, 2013, 10 pgs.

U.S. Appl. No. 11/834,817, Appeal Decision mailed Jul. 25, 2014, 7 pgs.

U.S. Appl. No. 11/834,817, Notice of Allowance mailed Oct. 31, 2014, 5 pgs.

(56) References Cited

OTHER PUBLICATIONS

U.S. Appl. No. 12/104,205, Non Final Office Action mailed Oct. 8, 2014, 6 pgs.
U.S. Appl. No. 12/104,205, Notice of Allowance mailed Jan. 13, 2014, 11 pgs.
U.S. Appl. No. 12/104,205, Notice of Allowance mailed Jun. 24, 2014, 6 pgs.
U.S. Appl. No. 12/104,205, Response filed Jan. 8, 2015 to Non Final Office Action mailed Oct. 8, 2014, 28 pgs.
U.S. Appl. No. 13/600,937, Final Office Action mailed Oct. 17, 2013, 17 pgs.
U.S. Appl. No. 13/600,937, Non Final Office Action mailed Apr. 11, 2014, 17 pgs.
U.S. Appl. No. 13/600,937, Non Final Office Action mailed Oct. 8, 2014, 23 pgs.
U.S. Appl. No. 13/600,937, Response filed Jan. 17, 2014 to Final Office Action mailed Oct. 17, 2013, 10 pgs.
U.S. Appl. No. 13/600,937, Response filed Jul. 8, 2014 to Non Final Office Action mailed Apr. 11, 2014, 10 pgs.
U.S. Appl. No. 13/600,937, Response filed Dec. 31, 2014 to Non Final Office Action mailed Oct. 8, 2014, 13 pgs.
"Application U.S. Appl. No. 12/104,205, Final Office Action mailed May 8, 2015", 11 pgs.
"Application U.S. Appl. No. 12/104,205, Response filed Aug. 7, 2015 to Final Office Action mailed May 8, 2015", 20 pgs.
"Application U.S. Appl. No. 13/600,937, Final Office Action mailed Apr. 22, 2015", 28 pgs.
"Application U.S. Appl. No. 13/600,9371, Response filed Jul. 21, 2015 to Final Office Action mailed Apr. 22, 2015", 14 pgs.
"Application U.S. Appl. No. 14/611,087, Preliminary Amendment filed Feb. 16, 2015", 7 pgs.

\* cited by examiner

METHOD, MEDIUM, AND SYSTEM FOR COMPARISON SHOPPING

CROSS REFERENCE TO RELATED APPLICATIONS

This application claims the benefit under 35 U.S.C. §119 (e) of U.S. Provisional Patent Application Ser. No. 60/912,077 filed Apr. 16, 2007 ("PUBLICATION AND INFORMATION SYSTEM"), which is incorporated by reference in its entirety herein.

FIELD

This application relates generally to data processing, and more specifically to a system and method for comparison shopping.

BACKGROUND

Online product comparison helps shoppers find lower price for commodities or services.

BRIEF DESCRIPTION OF DRAWINGS

Embodiments are illustrated by way of example and not limitation in the figures of the accompanying drawings, in which like references indicate similar elements and in which.

DETAILED DESCRIPTION

Comparing products listed for sale by an individual seller, online store, or online marketplace to products listed for sale by another individual seller, online store, or online marketplace may be difficult and time consuming. A buyer may not be aware of other marketplaces or may not be skilled at entering precise key words when searching for similar items. Further, it takes a considerable effort for a buyer to note different pricing and shipping arrangements from several online stores or marketplaces.

Typically, a user shopping around for the best price of a product may have to go to different Internet sites and compare prices. For example, a user looking for a particular DVD player may go to the Best Buy website first, note the price and then go to the Circuit City website in order to compare prices between the two online vendors. Thus, the user would perform multiple clicks and browse through various web pages. The system and method for comparison shopping introduced in this disclosure may permit using fewer clicks to compare prices from different vendors within the same browser window, thus saving the user time and energy.

The system and method for comparison shopping, in some example embodiments, is a tool (e.g., a browser plug-in) that may be utilized to compare the price of a product displayed on a web page to prices of the same or similar product available at other electronic marketplaces (e.g., eBay). The system and method for comparison shopping may extract keywords, appropriately describing the product or service from the source document of a web page, and utilize the extracted keywords in an online marketplace search.

The system and method for comparison shopping may be utilized by sellers and buyers alike. Sellers may find it convenient to list a product on a marketplace while the right category and product description is generated for them automatically. Buyers may find it convenient to be able to see the prices from other vendors without leaving the product web page. Moreover, the system and method for comparison shopping may generate statistical data such as the lowest and the average price of the product across a marketplace or the number of auctions set to end within a certain time (e.g., one hour). Links to the product listings included in the generated statistics may be provided.

Figure 1:
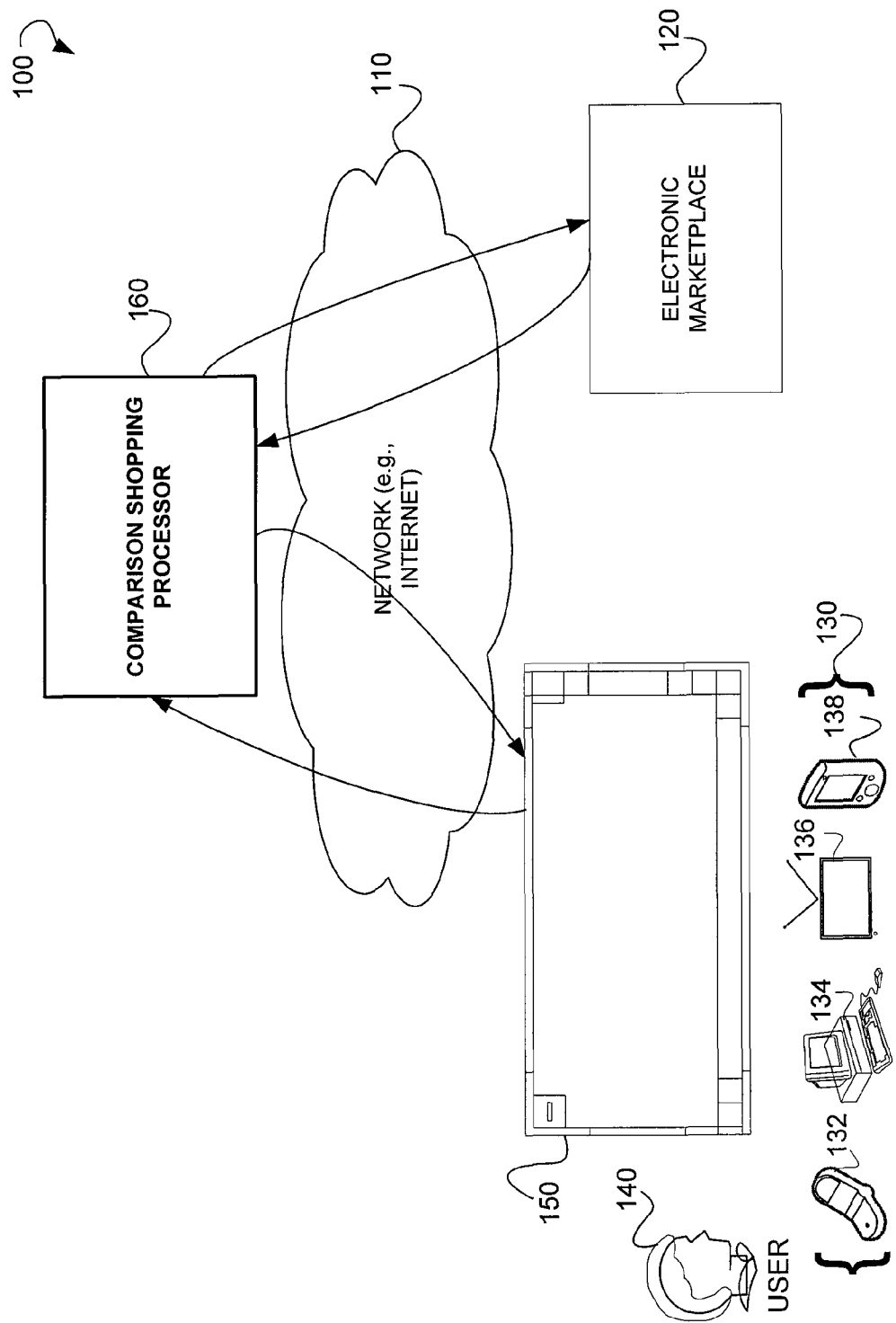
FIG. 1 is a block diagram illustrating an architecture within which a system and method for comparison shopping may be implemented, in accordance with an example embodiment.

FIG. 1 illustrates a network environment 100 that may include a network 110, an electronic marketplace 120, client devices 130, a user 140, a client application 150, and a comparison shopping processor 160. The network 110 may be a network of data processing nodes that are interconnected for the purpose of data communication. The electronic marketplace 120, in the context of the example network environment, is an online auction and fixed price shopping website that may be configured to permit individual users and businesses to buy and sell goods and services (e.g., eBay).

In some example embodiments, the method and system for comparison shopping may facilitate comparison of a product a user is viewing on a web page with the offerings that are posted on one or more marketplaces or with the offerings posted on different versions of the same marketplace. For example, a marketplace that features both auctions and fixed price transactions (e.g., eBay) may have a version that offers only fix price transactions (e.g., eBay Express).

The client devices 130, in some example embodiments, may include a Graphical User Interface (GUI). In a typical GUI, instead of offering only text menus or requiring typed commands, the system presents graphical icons, visual indicators or special graphical elements called widgets that may be utilized to allow the user to interact with the client application 150. The client devices 130 may be configured to utilize icons used in conjunction with text, labels or text navigation to fully represent the information and actions available to users.

The client devices 130 may include a mobile telephone 132, a computer 134, a television (TV) set 136, and a personal digital assistant (PDA) 138. The user 140, in some example embodiments, is a person interacting with the client application 150 via the client devices 130. In some other embodiments, the user 140 may be represented by an automated process designed to simulate a person.

The client application 150, in some example embodiments, is an Internet browser configured to display web pages including products for sale based on an underlying data resource (e.g., HTML file). Typically, the underlying data resource may include information displayed by the client application 150 with certain parts of the data resource being more informative than others. For example, the header of an HTML file may include a title that describes the product being displayed.

In some example embodiments, the title describing the product may be parsed and product descriptors may be extracted. Thereafter, the extracted descriptors may be utilized to search the electronic marketplace 120 in order to compare prices. Each result of the search may be categorized as being an auction or a fixed price item. Product statistics such as the average price for each category may be displayed. Other categorizations may be displayed, for example, auctions set to end with a certain time period (e.g., 1 hour).

In some example embodiments, the system and method for comparison shopping may utilize a browser toolbar with various buttons. For example, there may exist two buttons, one for a buyer and one for a seller. When a buyer selects the buyer's button, the buyer will be taken to the electronic marketplace 120 with the product, its category pre-filled, and the results of the search displayed. This may be implemented by parsing the title of the underlying data resource. For example, an HTML file may include a title that is anchored by two HTML tags, <title> and </title>. In other example embodiments, other information included in the underlying data resource may be parsed in order to identify descriptors of the product displayed by the client application 150 and to generate the search query.

In some example embodiments, the browser toolbar is a plug-in such as a Browser Helper Object (BHO) for Microsoft's Internet Explorer or an extension for the Mozilla Firefox web browser. In addition to providing buyers with price comparisons, the plug-in may dynamically display advertisements for related products, or may direct buyers to related blogs. The plug-in may be capable of displaying deals with buttons like "soon to end auctions" or may automatically start a sale with a push of a button. The example plug-in may be used with any product page on the Internet. The plug-in may permit direct linking to a product having certain attributes, for example, the lowest bidding price auction ending within 1 hour, or the lowest fixed price. Additionally, the total number of fixed price offerings of the product may be displayed. The plug-in may also display the total number of items with auctions ending within a certain period of time and their average price.

In some example embodiments, the system and method for comparison shopping permits automatic finding of the best deals ending soon and provides relevant information in order to describe such deals in sufficient detail to enable a user to assess the deals. Thus, for example, the lowest fixed price item for a particular product can be found along with a corresponding auction that has a lowest price, with both conveniently displayed for a user to view. Another example includes providing a toolbar giving one-click access to an auction that is ending within a predetermined time. The toolbar may also display supporting data, such as the lowest fixed price and average selling price, to help the user make an informed decision. The client application 150 utilized to present the information to a user is described in more detail below with reference to FIG. 3.

Figure 2:
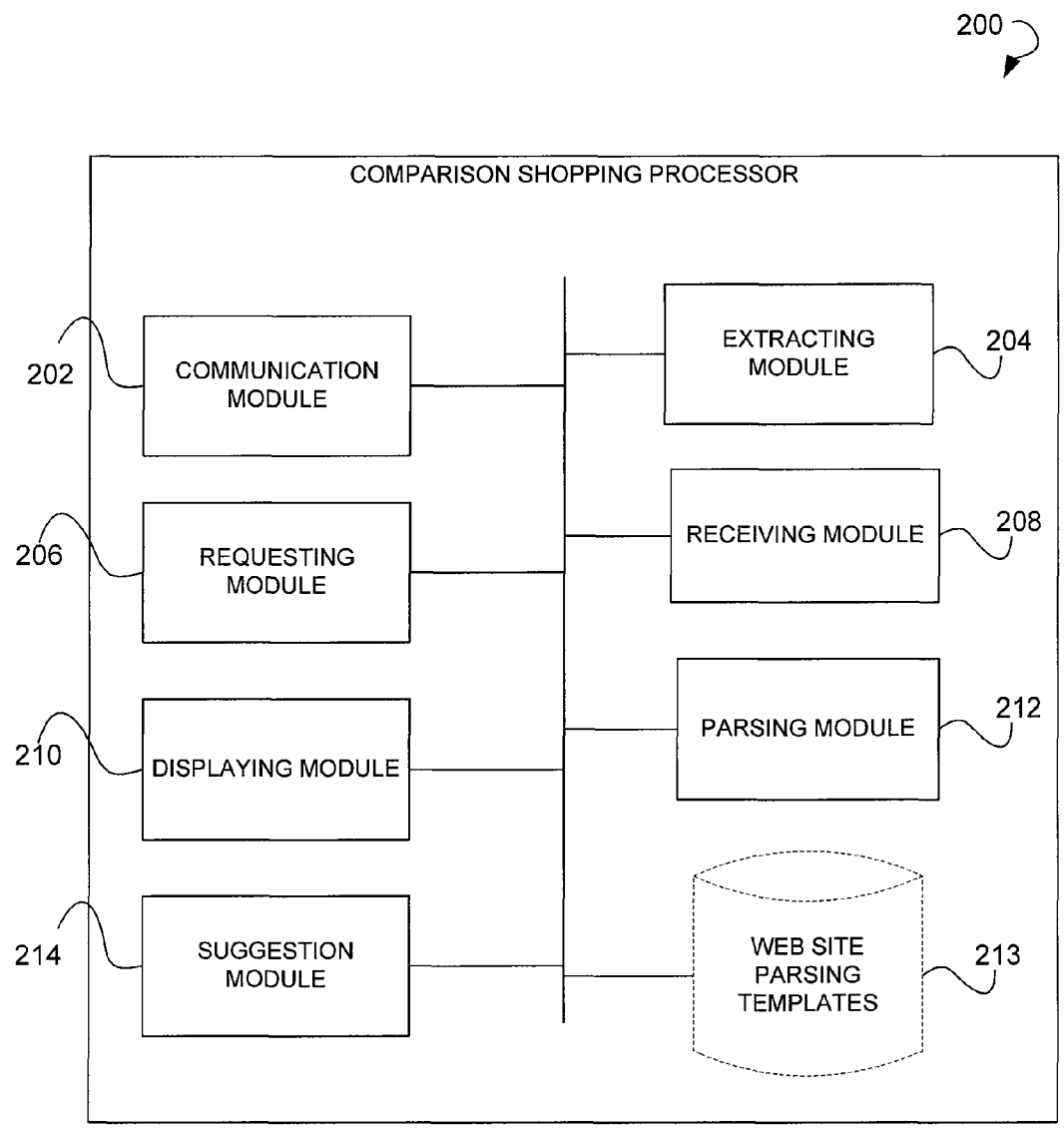
FIG. 2 is a block diagram illustrating a comparison shopping processor, in accordance with an example embodiment.

The comparison shopping processor 160 may be implemented as web service application. FIG. 2 illustrates a more detailed block diagram of a comparison shopping processor 200, in accordance with an example embodiment. The comparison shopping processor 200, in some example embodiments, may include a communication module 202, an extracting module 204, a requesting module 206, a receiving module 208, a displaying module 210, a parsing module 212, and a suggestion module 214.

Note that although the embodiment of FIG. 1 implements comparison shopping processor 160 as a web service, in other embodiments, the comparison shopping processor 200 may be located within the client application 150 (e.g., Internet Explorer). In some other example embodiments, the comparison shopping processor may have a distributed architecture. For example, one distributed architecture may perform only parsing and keyword extraction in the client application 150 with the remaining work performed by a remote server based application.

In some example embodiments, the results of a search of more than one marketplace or more than one version of the same marketplace may be displayed side by side on the same web page. In some example embodiments, the user may be able to exercise control over which marketplaces are searched.

Referring back to the comparison shopping processor 200 of FIG. 2, the communication module 202 may be configured to receive a data resource associated with an offering of a product along with product offering terms. The data resource, in some example embodiments, may be an HTML, XML or some other markup language file including product description and the price of the product. The extracting module 204 may be configured to extract product descriptors from the data source. For example, the title of the web page included in the header of an HTML file may read "Circuit City Canon Digital EOS". The extracting module 204 may strip off the words "Circuit City," thus leaving only text that it considers to be relevant, and thereby providing better search results.

In one example embodiment, the comparison shopping processor 200 maintains a set of web site parsing templates 213 that the extracting module 204 may use to determine how to parse particular web site. The web site parsing templates could specify what words could be safely ignored (such as the name of the web site retailer) and where to locate specific information that would be useful for performing a search such as how the web site encodes brand names and product model numbers.

Once the keywords or descriptors are determined, the descriptors may be utilized to search the electronic marketplace 120. The search results may include various attributes associated with the offerings for the product on the electronic marketplace 120. The attributes may include offering terms such as price or time until the end of an auction. Other offering terms returned with the search results may include categories. The comparison shopping processor 200 may then process the results of the search and the offering attributes to generate statistical data.

The requesting module 206 may be configured to request a search of marketplace offerings of a product based on product descriptors, and the receiving module 208 may be configured to receive results of the search along with the marketplace offering terms of the product.

In some example embodiments, comparison shopping processor 200 may get an address of the data resource as Uniform Resource Locator (URL) of the data resource from the client device 150. The comparison shopping processor 200 may then obtain the data resource from the address and parse the received data resource. A search string generated by the parsing of the data resource may be submitted to a marketplace Application Programming Interface (API) which may be an internal marketplace API or an API that is open to the marketplace development community. In some example embodiments, the search string may be sent simultaneously to more then one API.

The parsing module 212 may be configured to parse the data resource. The parsing module 212 may be included in the extracting module 204 or may exist on its own within the comparison shopping processor 200. The parsing module 212 may also use the set of web site parsing templates 213 to help parse the data resource if the data resource is in the form of a web page from a web site that is commonly used with the comparison shopping processor 200.

The suggestion module 214 may be utilized to suggest titles of the product based on the product descriptors. Thus, a user may be provided with possible titles of the product displayed on the web page when the extracting module 204 may not, with a certainty, determine the descriptors of the product. For example, a user may be provided with a keyword and a question "is that what you are looking for?" In some other example embodiments, the comparison shopping processor 200 may cause areas of the product web page to be highlighted and clickable, while suggesting that the user click on the highlighted area that appropriately describes the product.

In some example embodiments, a filter object may be utilized between the client application 150 and the comparison shopping processor 160. The filter object may permit displaying of information without requiring a browser toolbar installation. In some other example embodiments, the information may be included in a different toolbar, providing the user with an option to enable it on demand. More detail on the above-mentioned modules of the comparison shopping processor 200 is provided below with reference to FIGS. 5 and 6.

Figure 3:
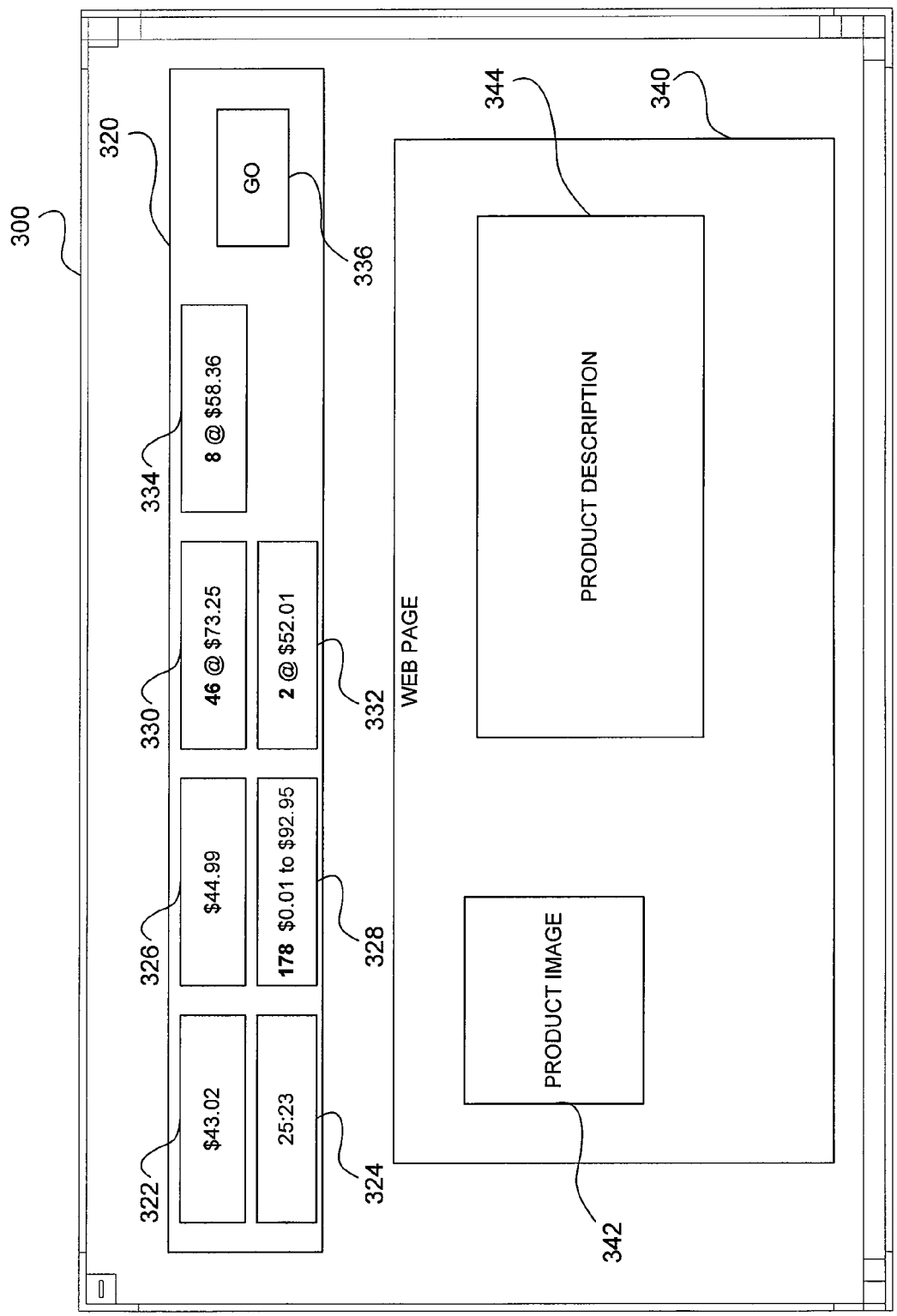
FIG. 3 is a block diagram illustrating a client application utilized in comparison shopping, in accordance with an example embodiment.

FIG. 3 is a block diagram illustrating a client application 300 utilized in comparison shopping, in accordance with an example embodiment. The client application 300, in some example embodiments, includes a toolbar 320 and a web page 340. The toolbar 320 may, in some example embodiments, be implemented as a browser helper object. The client application may further include toolbar buttons 322, 324, 326, 328, 330, 332, 334, and 346.

The toolbar button 322, in some example embodiments, may be configured to represent the lowest bidding price auctions ending in one hour (e.g., $43.02). Links to these auctions may also be provided on the toolbar button 322. The toolbar button 324 may be configured to represent a countdown timer for the lowest bidding item ending within one hour (e.g., 25:23). The toolbar button 326 may be configured to represent the lowest fixed price for the product (e.g., $44.99). Links to the corresponding websites may be provided on the toolbar button 326.

The toolbar button 328 may be configured to represent the total number of items on the electronic marketplace 120, and their price range (e.g., 178 $0.01 to $92.95). The toolbar button 330 may be configured to represent the total number of fixed price items on the electronic marketplace 120 and the average price (e.g., 46 items in total @ average price of $73.25). The toolbar button 332 may be configured to represent the total number of items ending within one hour and their average price (e.g., 2 items ending within an hour @ average price of $52.01). The toolbar button 334 may be configured to represent the number of items on a fixed price marketplace and their average prices (e.g., 8 fixed-price items @ average price of $58.36). The toolbar button 336 may be configured to represent the button initiating the price comparison process (e.g., GO). The web page 340 may display a product image 342 and a product description 344.

Figure 4:
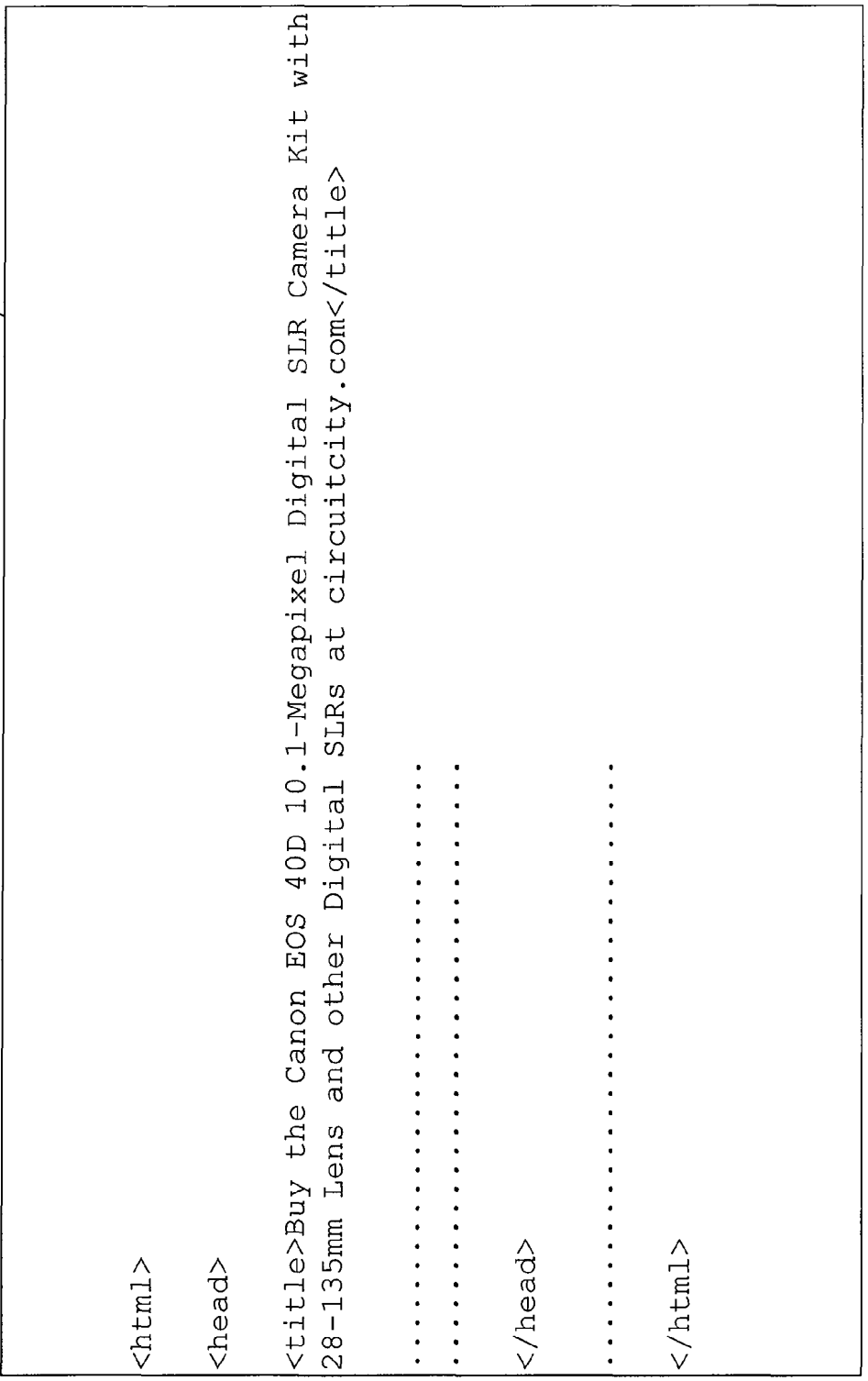
FIG. 4 is a block diagram illustrating a data resource for a client application, in accordance with an example embodiment.

FIG. 4 is a block diagram illustrating a data resource 400 for a client application, in accordance with an example embodiment. The data resource 400, in some example embodiments, may be represented by a mark-up language source file such as HTML or XML. The data resource 400 may provides a means to describe the structure of text-based information in a document by denoting certain text as links, headings, paragraphs, lists. The data resource 400 may supplement the text with interactive forms, embedded images, and other objects. The data resource 400 may be written in the form of tags.

In some example embodiments, the information about the product displayed by the client application 150 may be extracted from the data resource 400. The data resource 400 may be parsed in order to ascertain product descriptors. In some example embodiments, only parts of the data resource 400 may be parsed. For example, only the header of the data resource 400 may be parsed to ascertain the product descriptors. The data resource 400 shows an example header of a Circuit City website describing the Canon EOS 40D camera. The title of the header reads "Buy the Canon EOS 40D 10.1-Megapixel Digital SLR Camera Kit with 28-135 mm Lens and other Digital SLRs at circuitcity.com". Upon clicking on the toolbar button 336 described with reference to FIG. 3, the header of the data resource 400 may be parsed by the parsing module 212 of the comparison shopping processor 200 of FIG. 2. Thereafter, words such "circuitcity.com" may be deemed irrelevant to the search and not used to generate search descriptors.

It may be typical of an Internet store to have information about the product displayed in the title section. Thus, as already mentioned above, in some embodiments, only the title may be parsed. The title may be parsed at the client or may be sent to the marketplace internal API for keyword extraction. In some other example embodiments, the whole of the data resource 400 may be processed in order to extract product keywords. This may be beneficial in cases where it is difficult to determine the precise model of the product from the header information. For example, the data resource 400 may contain information about Canon Rebel 40D but the header may only refer to Canon Digital Camera without a specific model. It would be beneficial then to parse the whole content of the data resource 400 in an attempt to determine the exact model.

Figure 5:
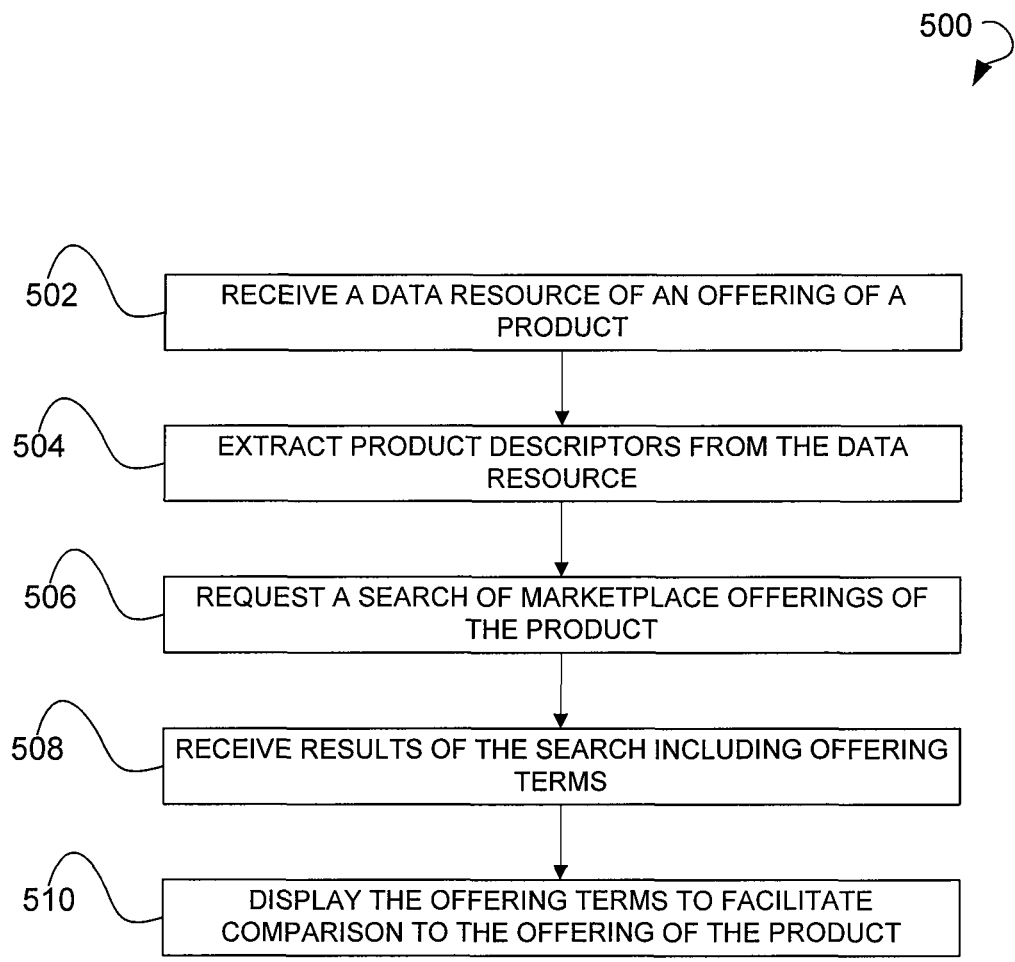
FIG. 5 is a high level flow chart illustrating a method for comparison shopping, in accordance with an example embodiment.

FIG. 5 illustrates an example method 500 for comparison shopping. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the comparison shopping processor 200, illustrated in FIG. 2. The method 500 may be performed by the various modules discussed above with reference to FIG. 2. Each of these modules may comprise processing logic.

As shown in FIG. 5, the method 500 may commence at operation 502, with communication module 202 receiving a data resource of an offering of a product. The date resource may include the product offering terms. At operation 504 the extracting module 204 may extract the product descriptors from the data resource, and at operation 506 the requesting module 206 may request a search of marketplace offerings of the product based on the product descriptors. At operation 508 the receiving module 208 may receive the results of the search. The results of the search may include marketplace offering terms of the product. At operation 510, the displaying module 210 may display the offering terms to facilitate comparison of the offering of the product to the marketplace offerings of the product. A more detailed example method for comparison shopping is described with reference to FIG. 6.

Figure 6:
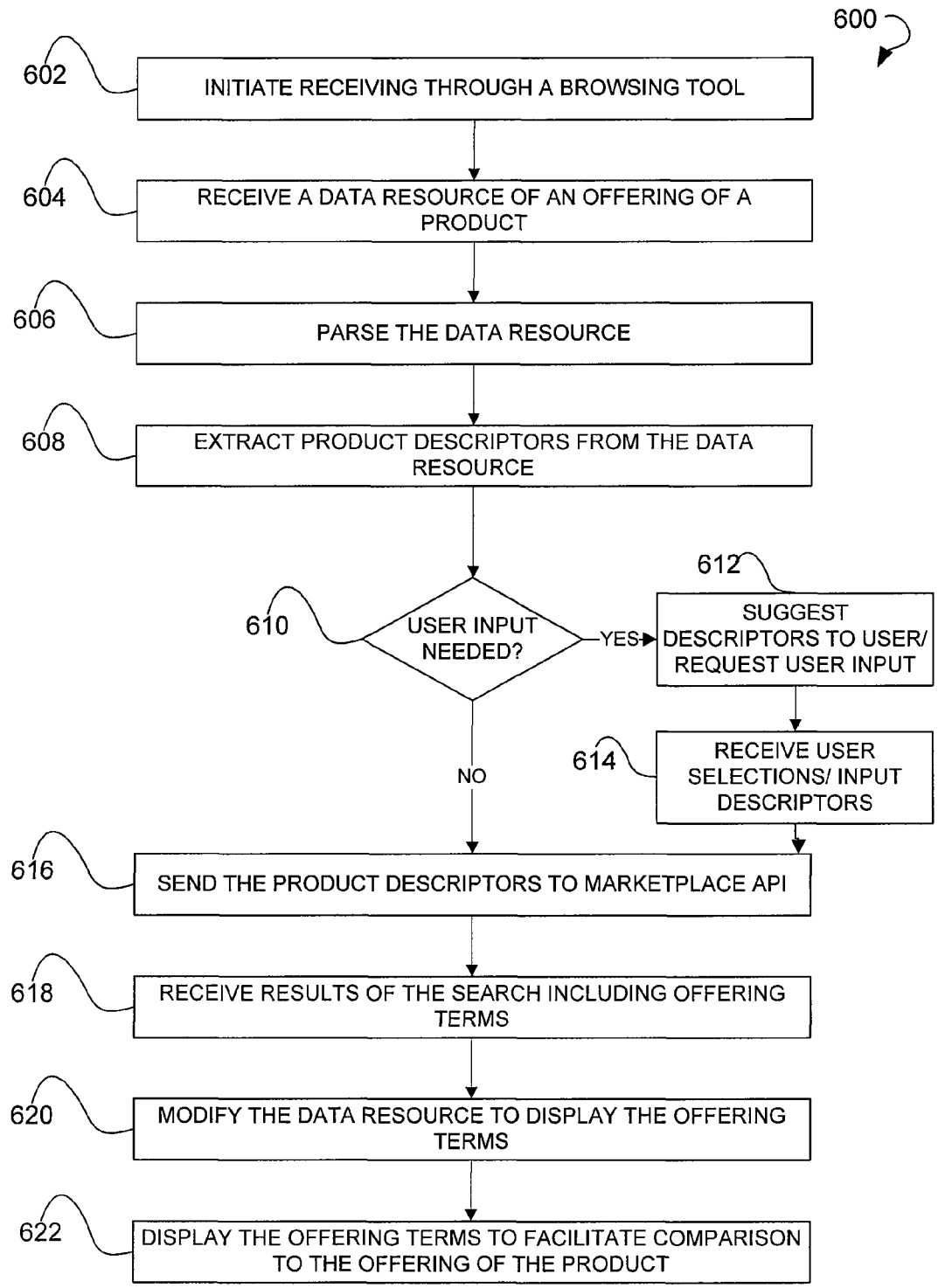
FIG. 6 is a flow chart illustrating a method for comparison shopping, in accordance with an example embodiment.

FIG. 6 is a flow chart of a method 600 for comparison shopping, in accordance with an example embodiment. As shown in FIG. 6, the method 600 may commence at operation 602, with a user requesting the comparison shopping processor to initiate receiving of a data resource from the browsing tool in order to perform a comparison by pressing the toolbar button 336. Upon pressing the toolbar button 336, at operation 604, the communication module 202 may receive a data resource of an offering of a product. At operation 606, the parsing module 212 may parse the data resource to ascertain product descriptors.

At decision block 610 it may be determined whether additional user input is needed. Such determination may be made because the information contained in the date resource is not sufficient to ascertain the descriptors of the product. If it is determined at decision block 610 that additional user input is needed, then at operation 612 the suggestion module 214 may suggest to the user various descriptors by displaying user options. In some example embodiments, the user may be able to enter descriptors by typing. The method 600 may then proceed to receive user selections of input descriptors by the communication module 202 at operation 614. Whether user input was requested or not, the method 600 may then proceed with the communication module 202 sending the product descriptors to the marketplace API at operation 616.

At operation 618, the receiving module 208 may receive results of the search including offering terms associated with the offerings, and at operation 620 the data resource may be modified to display the offering terms. The output offering terms may be processed in a manner appropriate for the requesting client device. Thus a full web-browser may display many results whereas a mobile telephone or other smaller device can only display limited results. At operation 622, the displaying module 210 may display the offering terms to facilitate comparison to the offering of the product.

Figure 7:
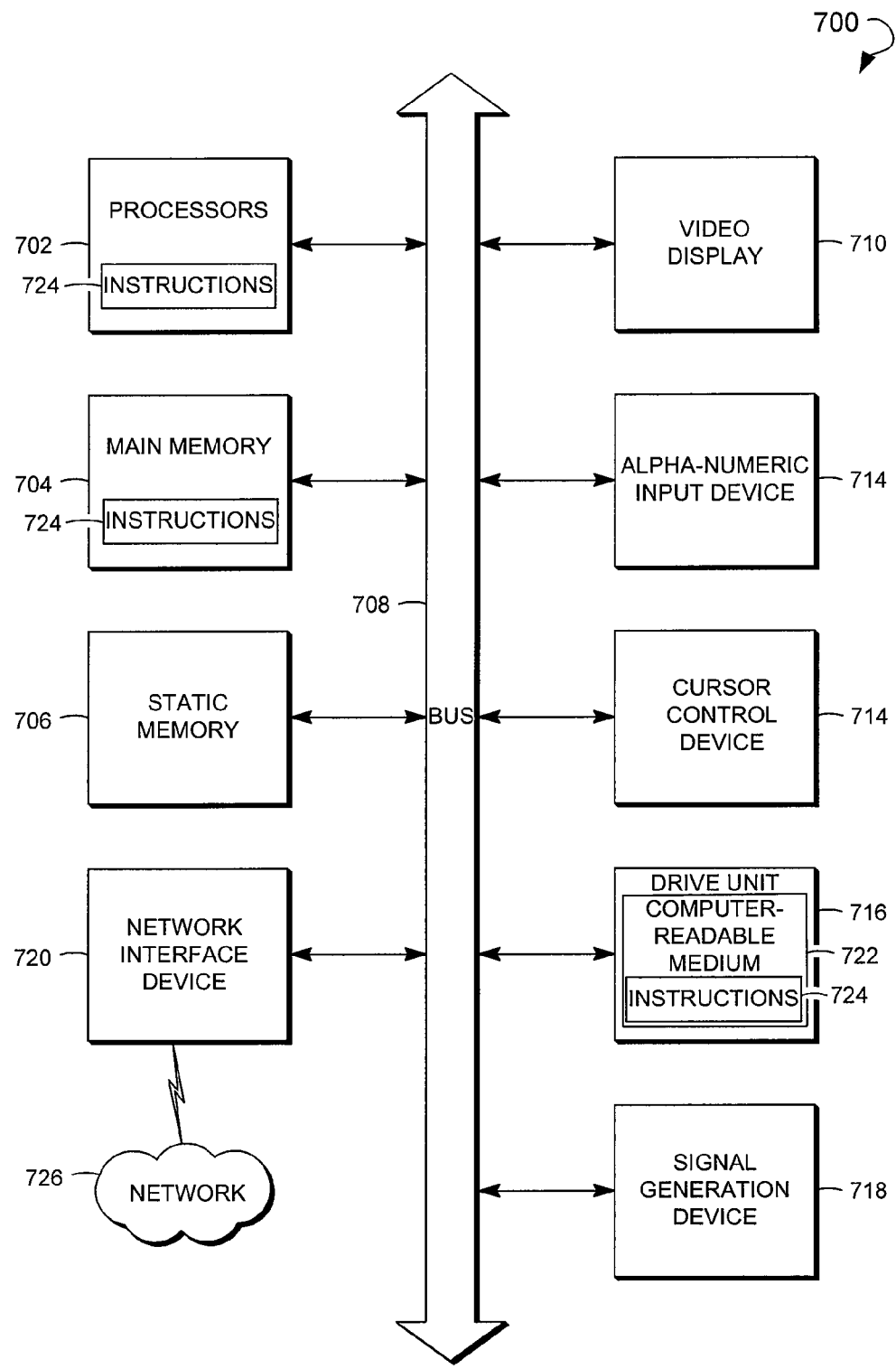
FIG. 7 is a diagrammatic representation illustrating an example machine in the form of a computer system within which a set of instructions, for causing the machine to perform any one or more of the methodologies discussed herein, may be executed.

FIG. 7 shows a diagrammatic representation of a machine in the example electronic form of a computer system 700, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 may also include an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a computer-readable medium 722, on which is stored one or more sets of instructions and data structures (e.g., instructions 724) embodying or utilized by any one or more of the methodologies or functions described herein. The instructions 724 may also reside, completely or at least partially, within the main memory 704 and/or within the processors 702 during execution thereof by the computer system 700. The main memory 704 and the processors 702 may also constitute machine-readable media.

The instructions 724 may further be transmitted or received over a network 726 via the network interface device 720 utilizing any one of a number of well-known transfer protocols (e.g., Hyper Text Transfer Protocol (HTTP)).

While the computer-readable medium 722 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, a system and method for comparison shopping have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A computer-implemented method comprising:
   extracting product descriptors from a product page;
   receiving a result of a search for prices of the product based on the extracted product descriptors;
   generating, using the result of the search for prices of the product, a price comparison result for the product displayed in the product page;
   identifying, using the price comparison result, a product with selected attributes;
   generating a buyer button, the buyer button including a direct link to the identified product with selected attributes;
   generating a browser toolbar and the product page contemporaneously in a client browser, wherein the browser toolbar includes a seller button, the buyer button, and the price comparison result for the product displayed in the product page; and
   generating, in response to operation of the seller button, a product listing on a marketplace, wherein generating the product listing includes determining a product category and a product description from the product descriptors extracted from the product page;

wherein the preceding steps are performed by a computer processor.

2. The computer-implemented method of claim 1, wherein displaying the comparison of prices for the product displayed in the product page includes displaying a lowest fixed price for the product.

3. The computer-implemented method of claim 1, wherein displaying the price comparison result for the product displayed in the product page includes displaying an average selling price for the product.

4. The computer-implemented method of claim 1, wherein displaying the price comparison result for the product displayed in the product page includes displaying a suggested price for the product, and wherein extracting product descriptors from a product page includes extracting the product title from the product page that displays the product.

5. The computer-implemented method of claim 1, wherein displaying the price comparison result for the product displayed in the product page includes displaying a suggested price for the product, and wherein extracting product descriptors from a product page includes extracting a product description from the product page that displays the product.

6. The computer-implemented method of claim 1, wherein displaying the price comparison result for the product displayed in the product page includes displaying a suggested price for the product, and wherein extracting product descriptors from a product page includes extracting a product category from the product page that displays the product.

7. The computer-implemented method of claim 1, wherein displaying the price comparison result for the product displayed in the product page includes displaying a range of prices for the product.

8. The computer-implemented method of claim 1, wherein displaying the price comparison result for the product displayed in the product page includes displaying a suggested price for the product within a range of prices for the product.

9. The computer-implemented method of claim 1, further comprising automatically starting a sale of the product using the product listing on the marketplace in response to the operation of the seller button.

10. The computer-implemented method of claim 1, wherein extracting product descriptors from the product page includes extracting product descriptors from a page title of the product page.

11. A computer-implemented system comprising a processor with a memory configured to:
extract product descriptors from a product page;
receive a result of a search for prices of the product based on the extracted product descriptors;
generate, using the result of the search for prices of the product, a price comparison result for the product displayed in the product page;
identify, using the price comparison result, a product with selected attributes;
generate a buyer button, the buyer button including a direct link to the identified product with selected attributes;
generate a browser toolbar and the product page contemporaneously in a client browser, wherein the browser toolbar includes a seller button, the buyer button, and the price comparison result for the product displayed in the product page; and
generate, in response to operation of the seller button, a product listing on a marketplace, wherein generating the product listing includes determining a product category and a product description from the product descriptors extracted from the product page.

12. The computer-implemented system of claim 11, wherein the processor displaying the browser toolbar further includes displaying the comparison of prices for the product displayed in the product page includes displaying a lowest fixed price for the product.

13. The computer-implemented system of claim 11, wherein the processor displaying the comparison of prices for the product displayed in the product page includes displaying an average selling price for the product.

14. The computer-implemented system of claim 11, wherein the processor displaying the comparison of prices for the product displayed in the product page includes displaying a suggested price for the product.

15. The computer-implemented system of claim 11, wherein the processor displaying the comparison of prices for the product displayed in the product page includes displaying a suggested price for the product, and wherein extracting product descriptors from a product page includes extracting a product description from the product page that displays the product.

16. The computer-implemented system of claim 11, wherein the processor displaying the comparison of prices for the product displayed in the product page includes displaying a suggested price for the product, and wherein extracting product descriptors from a product page includes extracting a product category from the product page that displays the product.

17. The computer-implemented system of claim 11, wherein the processor displaying the comparison of prices for the product displayed in the product page includes displaying a range of prices for the product.

18. The computer-implemented system of claim 11, wherein the processor displaying the comparison of prices for the product displayed in the product page includes displaying a suggested price for the product within a range of prices for the product.

19. A non-transitory computer-readable medium comprising instructions that, when executed by one or more processors of a machine, cause the machine to perform operations comprising:
extracting product descriptors from a product page;
receiving a result of a search for prices of the product based on the extracted product descriptors;
generating, using the result of the search for prices of the product, a price comparison result for the product displayed in the product page;
identifying, using the price comparison result, a product with selected attributes;
generating a buyer button, the buyer button including a direct link to the identified product with selected attributes;
generating a browser toolbar and the product page contemporaneously in a client browser, wherein the browser toolbar includes a seller button, the buyer button, and the price comparison result for the product displayed in the product page; and
generating, in response to operation of the seller button, a product listing on a marketplace, wherein generating the product listing includes determining a product category and a product description from the product descriptors extracted from the product page.

20. A computer-implemented apparatus comprising:
at least one computer processor and at least one memory;
an extraction module configured to:
extract product descriptors from a product page;
receive a result of a search for prices of the product based on the extracted product descriptors; and generate, using the result of the search for prices of the product, a price comparison result for the product displayed in the product page;

a seller module configured to:
   identify, using the price comparison result, a product with selected attributes; and
   generate a buyer button, the buyer button including a direct link to the identified product with selected attributes;

a display module configured to generate a browser toolbar and the product page contemporaneously in a client browser, wherein the browser toolbar includes a seller button, the buyer button, and the price comparison result for the product displayed in the product page; and a buyer module configured to generate, in response to operation of the seller button, a product listing on a marketplace, wherein generating the product listing includes determining a product category and a product description from the product descriptors extracted from the product page.

* * * * *